Figure 4:
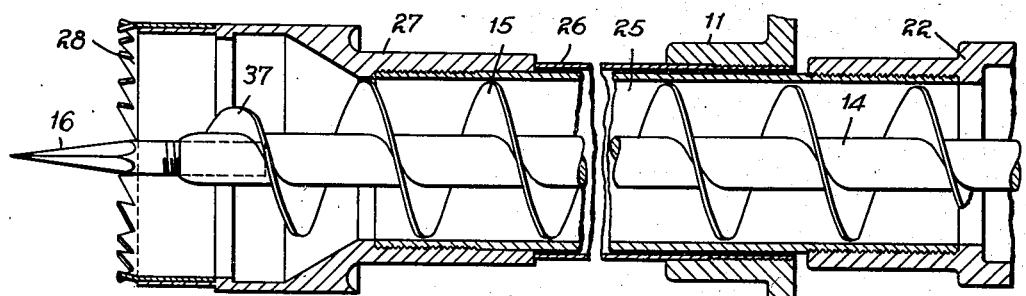

July 29, 1941.  J. F. JOY  2,250,670
DRILLING APPARATUS
Filed Jan. 20, 1939  6 Sheets-Sheet 1
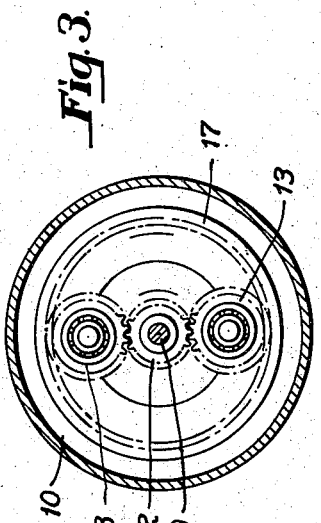
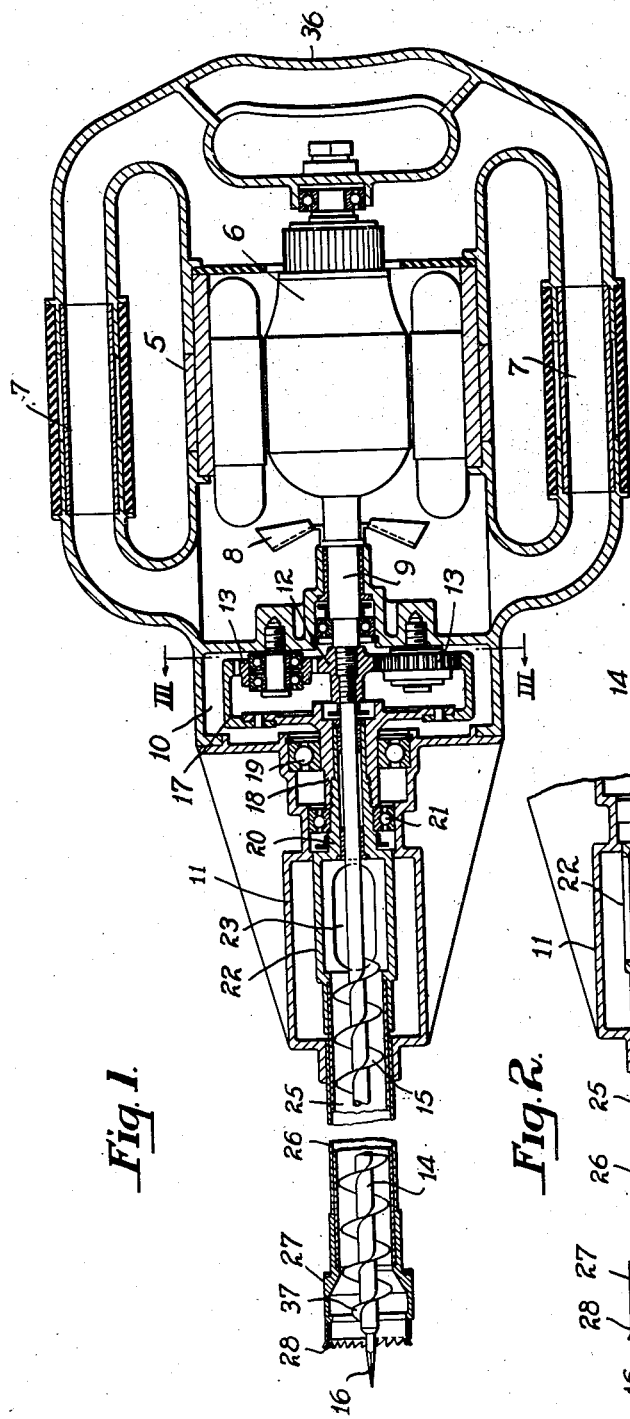
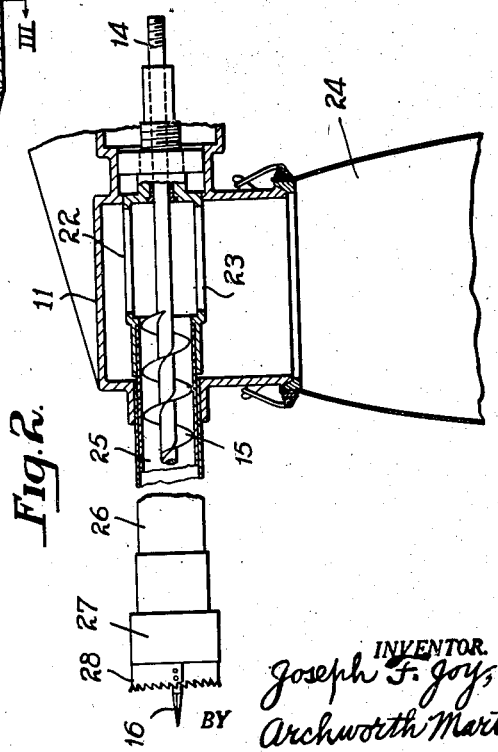
INVENTOR.
Joseph F. Joy,
BY Archworth Martin
ATTORNEY.

July 29, 1941.   J. F. JOY   2,250,670
DRILLING APPARATUS
Filed Jan. 20, 1939   6 Sheets-Sheet 2

INVENTOR.
Joseph F. Joy,
BY Archworth Martin,
ATTORNEY.

July 29, 1941.   J. F. JOY   2,250,670
DRILLING APPARATUS
Filed Jan. 20, 1939   6 Sheets-Sheet 3

INVENTOR.
Joseph F. Joy,
BY Archworth Martin,
ATTORNEY.

July 29, 1941.  J. F. JOY  2,250,670

DRILLING APPARATUS

Filed Jan. 20, 1939  6 Sheets-Sheet 4

INVENTOR.
BY Joseph F. Joy,
Archworth Martin,
ATTORNEY.

July 29, 1941.　　　　　J. F. JOY　　　　　2,250,670
DRILLING APPARATUS
Filed Jan. 20, 1939　　　　　6 Sheets-Sheet 5

INVENTOR.
Joseph F. Joy,
BY Archworth Martin,
ATTORNEY.

July 29, 1941.                J. F. JOY                2,250,670
                         DRILLING APPARATUS
                        Filed Jan. 20, 1939            6 Sheets-Sheet 6

INVENTOR.
Joseph F. Joy,
BY Archworth Martin,
ATTORNEY.

Patented July 29, 1941

2,250,670

UNITED STATES PATENT OFFICE 2,250,670

DRILLING APPARATUS

Joseph F. Joy, Pittsburgh, Pa., assignor, by mesne assignments, to Joy Manufacturing Company, Franklin, Pa., a corporation of Pennsylvania Application January 20, 1939, Serial No. 251,929

16 Claims. (Cl. 255—19)

My invention relates to material penetrating and removal apparatus that is hereinafter described as employed in the penetration and removal of coal, and particularly to provide holes for use of explosives or other devices to break out the coal, but the apparatus can also be used in the drilling of stone and other materials, or for the penetration and removal of the same.

There are various hazards in connection with the use of conventional forms of previously existing motor-driven drills in coal mines and other places. One problem is the danger of the operator's clothing becoming entangled with rapidly rotating and unshielded augers. Also there are kick-backs that result from unexpected contact by the drill with hard spots which are common to coal seams, shocks which are caused by penetration of the drill into miniature cavities, and choking or clogging of the augers. These kick-backs frequently are sufficient to overcome the strength of the operator to resist the counter-turning force of the driving motor, and the drill handles become wrested from his hands, with danger of injury to him by the wild movements of the apparatus over which he has lost control.

Another objection to the use of previous forms of motor-driven drills which are manually held during drilling operations, is that the operator becomes fatigued through having to manually hold the drill in operating position and force the same into the material, and at the same time resisting the torsional forces of the motor.

It has been found that the much dreaded silicosis disease arises from exposure to dust common to drilling operations in the earth's strata, such as mines, tunnels and quarries. I have provided effective means of eliminating these hazards, by collecting the drill cuttings into suitable containers.

I have found that the many different materials in which drilling is done present a wide variation in physical characteristics and structures. For instance, most metals—particularly those in the less fragile class—present a condition which requires that all material within the area of the hole be cut away as the hole is advanced by the rotation of the drilling element. In the case of the more fragile materials, such as coal, slate, limestone and most other earth stratifications, much more rapid penetration is obtained by limiting the cutting action to but a part of the total area of the face of the hole and providing means for effectively breaking away the uncut portion. I have further found that by the use of this principle a more rapid penetration of such material results, and much less force is required to cause the drilling device to penetrate the material being drilled, when cutting but a part of the hole away, than is the case when the entire area is being cut.

While such a method is not practical in drilling some metals, particularly those in the malleable classes, I have, however, found that a greatly increased rate of penetration results from rotating the inner one of a pair of concentric drilling members at a relatively higher rate of speed than that at which the outer member revolves. It has long been common practice in the metal working trade, where a relatively large hole is required to proceed by first drilling a small lead hole and following this up with a larger drill of the required size. In performing this operation, the smaller drill is of course driven at a higher rate of speed than the larger one. In most cases in order to obtain the greatest efficiency, the peripheral speeds of the outer surfaces of the two drills are close to and within the allowable limits. My invention provides effective means for performing both of these operations simultaneously.

In addition to securing the various advantages above referred to, my invention has for its objects means for providing a more simplified form of apparatus which will have more rapid penetration, greater capacity, a higher degree of safety and a device that can be operated more conveniently than the various types of drills and other penetrating devices heretofore employed.

Diamonds have long been used as the cutting element of earth penetrating tools. More recently tungsten carbide and other compositions of especially hard structure are being widely used on the cutting faces of drills used for the penetration of various earth stratas and also metals. The chief waste accompanying the use of these materials is that of breakage. Breakage frequently results from the drill unexpectedly penetrating voids, crevices, or hard spots in the material being drilled. This is particularly true of the various earth stratas forming mining, tunnelling and quarrying operations.

One object of my invention is to provide a feeler or test member operating as a pilot in advance of the main cutting members to indicate or give warning of change in the nature of the material being penetrated.

Another object of my invention is to provide cutters of a form and a combination of arrangements for their operation more favorable for the use of tungsten carbide and the like as a facing for the cutting edges. A still further object is to so form the cutters as to permit the use of smaller and the less expensive sizes of tungsten carbide or other hard facing materials as the cutting medium.

A still further object of my invention is to provide cheap replaceable cutting members, such as ordinary twist drills and saw blades for the penetration of softer materials such as clay, coal and the like.

Another object of my invention is to provide a cutter operating in a circular path to cut the periphery of the hole and an inner high speed pilot member to cut away and break up the core thus formed for obtaining exceedingly rapid penetration and safer operation.

Figure 5:
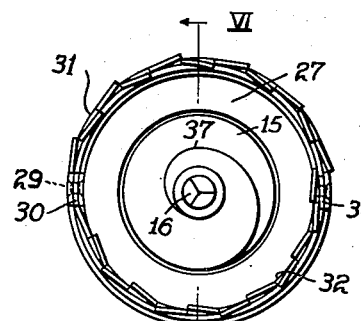
Figure 6:
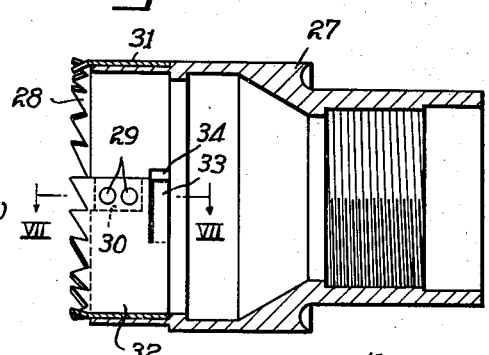
Figure 7:
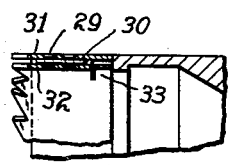
Figure 8:
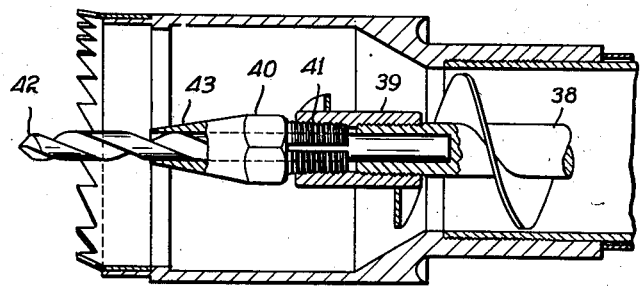
Figure 9:
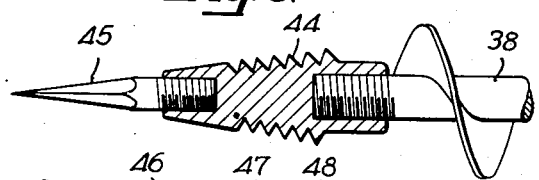
Figure 10:
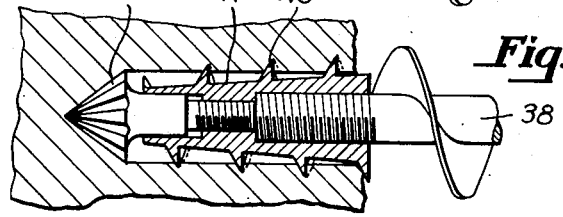
Figure 11:
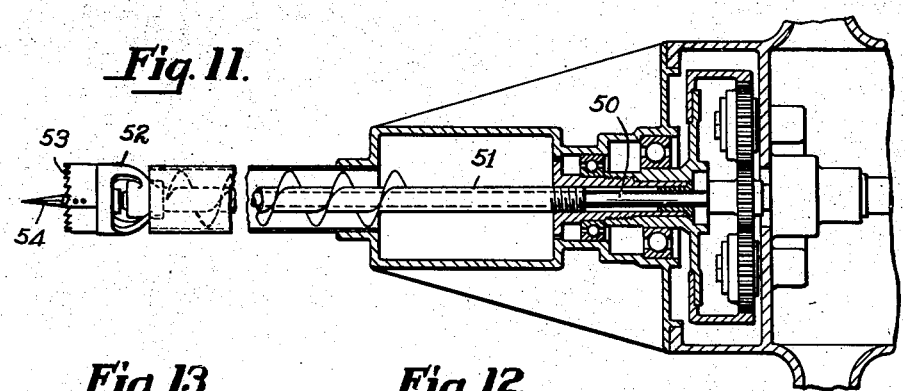

Some of the forms which my invention may take are shown in the accompanying drawings wherein Figure 1 is a sectional plan view of a drilling apparatus embodying one form of my invention; Fig. 2 is a vertical sectional view through a portion of the apparatus of Fig. 1; Fig. 3 is a view taken on the line III—III of Fig. 1; Fig. 4 is a sectional view on an enlarged scale of the cutting and conveyer elements of Fig. 1; Fig. 5 is an end view of the structure of Fig. 4; Fig. 6 is a view taken on the line VI—VI of Fig. 5; Fig. 7 is a view taken on the line VII—VII of Fig. 6; Fig. 8 is a view similar to Fig. 4, but showing a modification of the invention; Figs. 9 and 10, respectively, show modified forms of center cutters which may be employed with the various forms of core cutters; Fig. 11 shows still another modification of the structure of Fig. 1.

Figure 13:
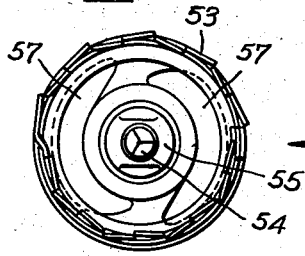
Figure 12:
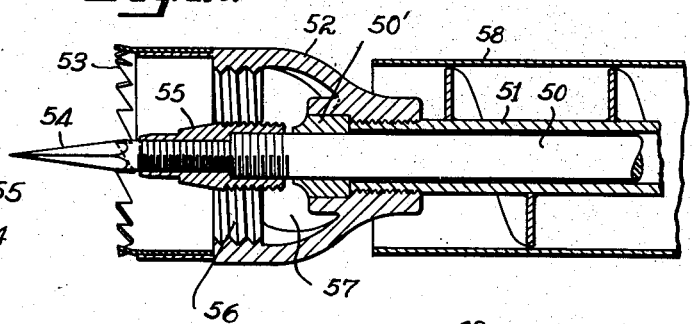
Figure 15:
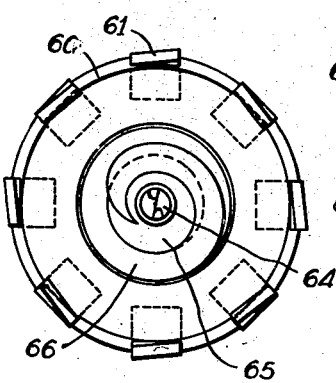
Figure 14:
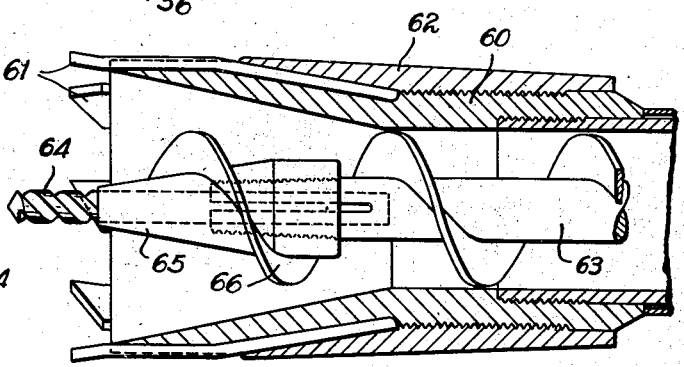
Figure 16:
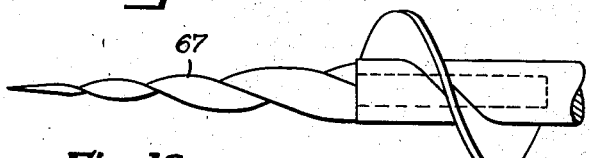
Figure 18:
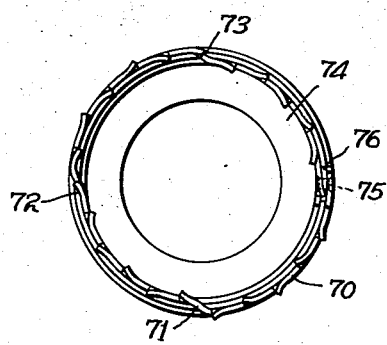
Figure 17:
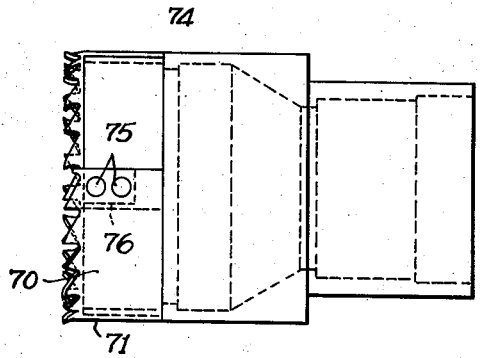
Figure 19:
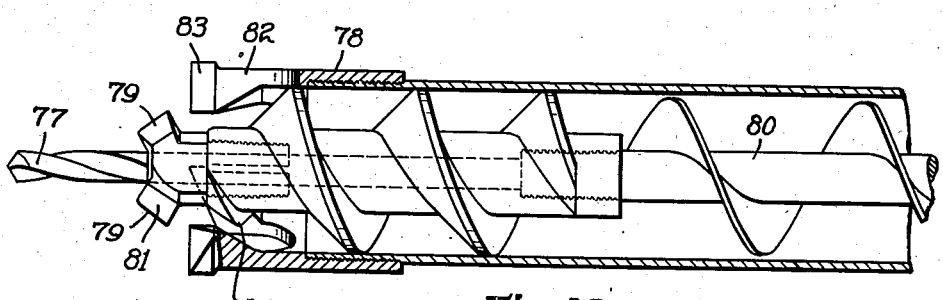
Figure 20:
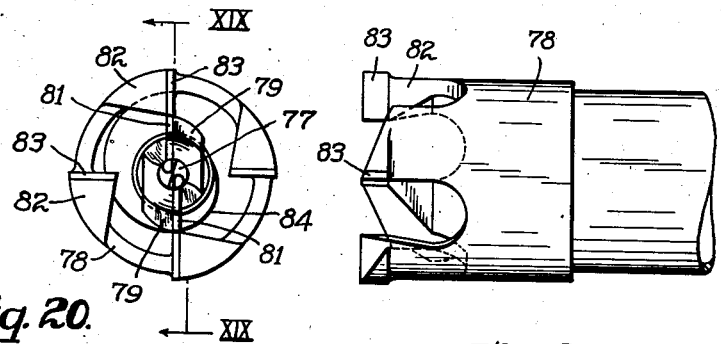
Figure 21:
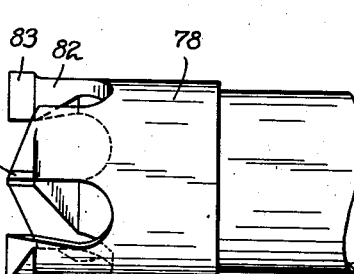
Figure 22:
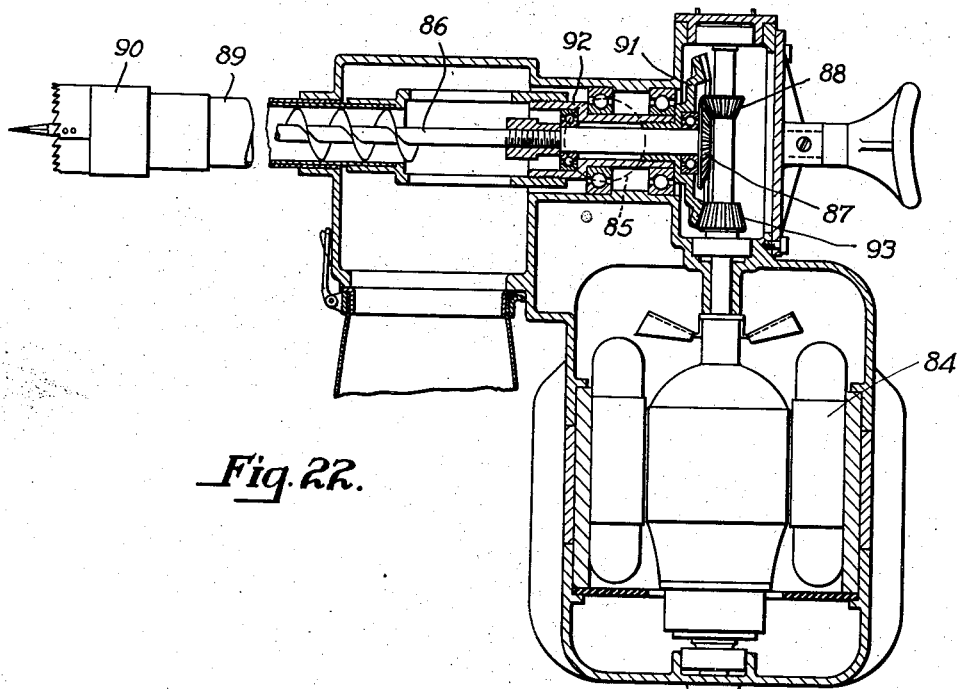
Figure 23:
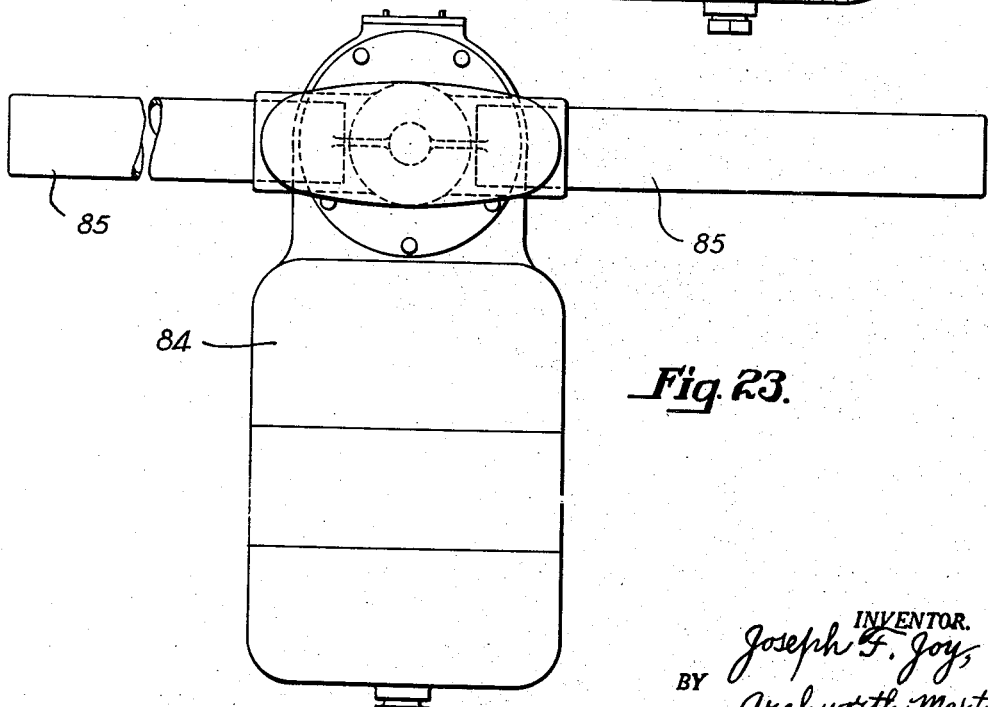
Figure 25:
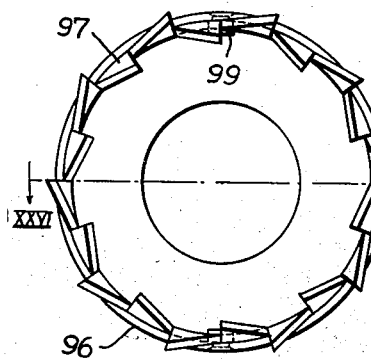
Figure 24:
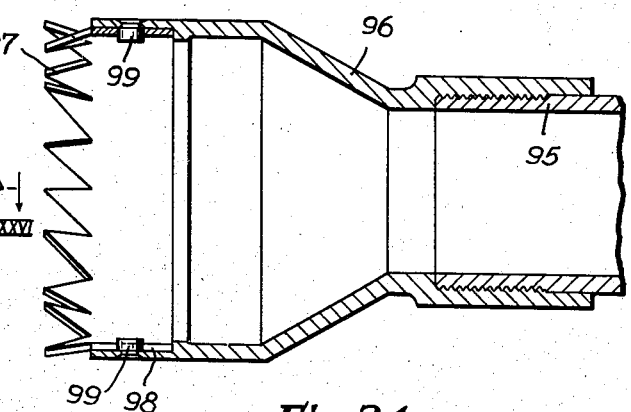
Figure 26:
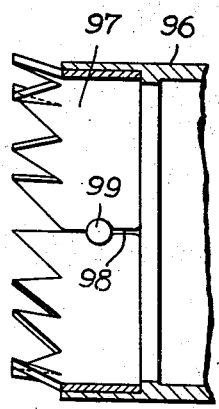
Figure 27:
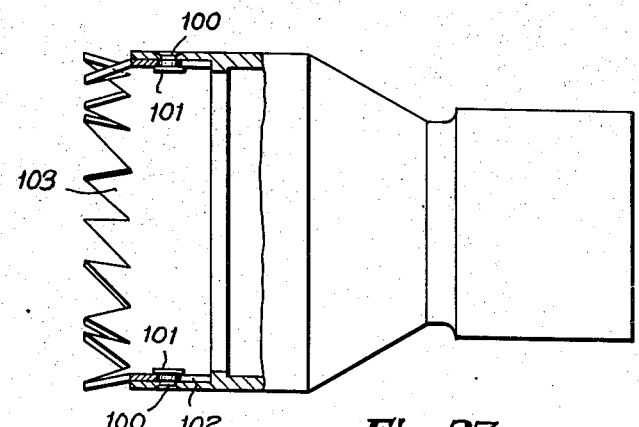
Figure 28:
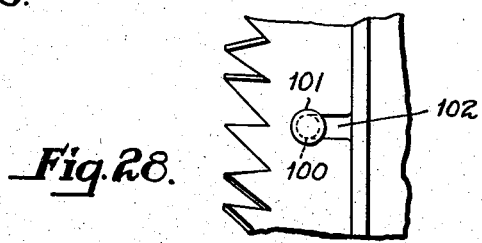

Fig. 12 is a sectional view on an enlarged scale of a portion of the structure of Fig. 11; Fig. 13 is an end view thereof; Fig. 14 is a sectional view showing core and center cutters of another form; Fig. 15 is an end view thereof; Fig. 16 shows a center cutter of gimlet-like form; Figs. 17 and 18 show a modification of the core cutter of Figs. 5 and 6; Fig. 19 shows another form of cutter, in combination with a second cutter and a drill element, taken on the line XIX—XIX of Fig. 20; Fig. 20 shows an end view thereof; Fig. 21 is a side view of the core cutter of Fig. 19; Fig. 22 shows a modification of the motor and drill arrangement of Fig. 1, partly in section; Fig. 23 is an end view thereof; Fig. 24 is a longitudinal sectional view of another form of core cutter; Fig. 25 is an end view thereof; Fig. 26 is a view taken on the line XXVI—XXVI of Fig. 25; and Figs. 27 and 28 are sectional and fragmentary side views of still another form of core cutter.

Referring first to Figs. 1 to 7, the apparatus includes a motor casing 5 for an electric motor 6 that is supplied with current from a suitable source of power. The casing is provided with tubular handle portions 7, by means of which the operator can conveniently hold the apparatus. A fan 8 is carried by the motor shaft 9 and serves to circulate air through the motor casing, including the passageways through the handles 7, for the purpose of cooling the motor. The air in passing through the handle 7 will lose heat by radiation, so that it is not necessary to draw outside air into the motor casing in order to maintain the motor in a cool condition; thereby avoiding openings to the atmosphere through which mine gases might be ignited by motor sparks, and also avoiding the drawing of dust-laden air into the casing.

The motor casing 5 has at its forward end a compartment 10 for housing certain of the transmission mechanism, and carries at its further extremity a housing 11 that serves as a support for shaft bearings. The forward end of the motor shaft 9 is threaded for the reception of a gear spindle 12, which has pinion teeth that mesh with gear wheels 13 that are supported upon bearings carried by the motor casing.

A spiral conveyer shaft 14 at its rear end has threaded connection with the spindle 12 and is therefore directly driven by the motor. Toward its outer end, the shaft 14 carries a spiral conveyer 15 and at its forward end carries a member 16 which, during operation of the apparatus, will serve as a centering device and pilot, as it penetrates the coal, and will cause the breaking-up of the core from the coal seam, as will be hereinafter explained.

The gear wheels 13 mesh with a ring gear 17 which is carried by a hub member 18, that is journalled in a bearing 19 which is carried by the housing 11. The hub member 18 has screw threaded connection with a tubular member 20 that is supported in a bearing 21 and the housing 11, the tubular member 20 serving as a shaft. The member 20 is enlarged at 22 and such enlargement is provided with openings 23 through which cores or cuttings are discharged into the housing 11 and thence into a bag or conduit 24, as hereinafter explained. Forwardly of the enlargement 22, the member 20 has a threaded socket for the reception of a shaft extension or drive tube 25. A protecting sleeve 26 surrounds the member 25 and is carried by the housing 11, and will be stationary during rotation of the shaft member 25.

The shaft member 25 carries at its forward end a core cutter 27. The cutter head 27 carries a saw 28, which is here shown as made in two sections, whose ends are connected together by rivets 29, or may be spot welded, the overlapping ends of the sections at the points of connection having spacer strips 30 interposed between them. The head 27 has slots for the reception of the spacer strips 30, the strips entering said slots when the assembled saw is slid into place upon the head. One section 31 of the saw member will lie against outer peripheral surface of the head 27, and the other section 32 of the saw will be disposed against the inner periphery of the head. This will result in the cutting of a wider kerf around the core than if the sections 31 and 32 were disposed in a common circle, thus providing clearance for the head 27, and hence permits of more convenient breaking up and displacement of the cores cut from the coal seam or other material than if a narrower kerf were cut around the core. Near its inner edge the saw member 32 is slotted in a circumferential direction to form a pair of tongues 33 which spring into slots 34 provided on the head 27, when the saw is slid into place upon the head.

The saws can be removed for replacement by a new cutter simply by using a screw driver or the like to press the tongues 33 to the planes of their respective band sections and then sliding the band off the cutter head.

The operation of the drilling apparatus is as follows: if, when viewing the apparatus from the rear end, the motor is driven in a clockwise direction, the shaft 14 will likewise rotate clockwise, while, by reason of the gearing 12—13—17, the core cutter 27 will be driven counter-clockwise. When the drill is pressed against the coal seam by the operator leaning against the breast-plate 36, the pilot point 16 will first enter the coal and will serve as a centering element. As the saw 38 engages the face of the coal, it will cut a cylindrical kerf and form a core between the inner side of the saw and the tool 16, whereupon during penetration of the tool into the coal, the core will be split and broken by reason of the tapered or wedge form of the tool 16 and the shaft 14, including the tapered end 37 of the conveyer structure. These fragments of coal are then engaged by the conveyer screw 15 and carried backwardly to the housing 11 and discharged into the receptacle 24. The high speed rotation (sometimes more than 1000 R. P. M.) of the spiral conveyer 15, carried by shaft 14, not only serves to remove the particles of broken core, but circulates an air current rearwardly through the tube in which it is encased. The path of the air current is into the hole, between the side walls of the hole and the outer walls of the tube and outward through the interior of the tube. The air thus circulated serves to collect particles of dust from the front and sides of the hole, into the interior of the tube, to be disposed of by the conveyer. The air current thus provided also prevents dust from accumulating back of the cutter head between the outer walls of the cutter head driving tube and the side walls of the hole where any accumulation of dust may interfere with the withdrawal of the apparatus from the hole. The cuttings are thus collected, so that there are no floating particles that would be injurious to the operator, and the core material is also collected in a convenient manner for easy disposal.

Another important feature of the invention resides in the fact that the core cutter 28 and the conveyer with the pilot 16 are rotated in opposite directions, so that the rotative forces applied thereto in effect balance one another. Thus during normal operations, there is little tendency for the entire tool to twist in the hands of the operator, since the torsional forces required to drive the core cutter are approximately counter-balanced by the torsional forces applied to drive the conveyer and the pilot. Not only is the operation of the drill thus less fatiguing to the operator, but if there is sudden resistance to turning movement of the coring tool, such as through encountering a hard substance in the coal, or in case it passes through a void in the coal and then again begins cutting, the reactive forces thus imposed upon the cutting head are largely absorbed by the pilot and the conveyer screw instead of throwing such a strain on the hands of the operator as may wrest the drill from his hands, with consequent danger of injury. The torsional loads of the outer and inner oppositely rotating members, resulting from the drilling of various materials, can be balanced by increasing or decreasing the size of the pilot 16, forming a cutting edge on the forward lip of 37, or adjusting the end of conveyer 37 to and from the face of the hole.

In Fig. 8 a modified form of pilot is shown, that may be employed in lieu of the wedge-like pilot 16. In this structure, the conveyer shaft 38 corresponds to the shaft 14 but has its end externally threaded for the reception of a coupling or collar 39 with which a chuck member 40 has threaded engagement, the threaded shank 41 of the chuck member being split and tapered, so that when the element 40 is screwed into place, it will grip the shank of a pilot drill 42. The nose portion 43 of the chuck member is tapered to split and break the core which enters the drill head.

It will be found desirable in drilling some materials to lengthen chuck member 40 so as to extend its nose portion 43 forward to the most effective position for breaking the core. Certain conditions also require that the nose portion 43 be provided with threads such as shown at 44 in Fig. 9, to pull the broken core from the front of the hole and move the broken particles rearwardly to the conveyer. It will also assist in the removal of cores in some materials, to provide relatively coarse threads in the inside walls of the slower and oppositely rotated heads carrying the outer cutters as at 56 in Fig. 12.

It will be understood that in the structures of Figs. 1 to 8 the threads at the joints of rotatable members extend in such direction that the driving forces tend to screw the parts more tightly together.

Referring now to Fig. 9, the conveyer shaft 38 has applied thereto a connecting member 44 which in turn carries a drill point 45. The connection 44 is of tapered form and has coarse threads thereon that assist in feeding or drawing the core rearwardly and breaking it apart.

In Fig. 10 I show another form of centering and core-boring device which may be substituted for the pilot of Figs. 4 and 8. A pilot member 46 cuts a hole for the entrance of the core-breaking member 48. In this structure the core-breaking member 48 is of conical form and functions somewhat after the manner of a corkscrew. It is connected to the shaft 38 by a coupling member 48, which has a spiral cutting tooth 48 that threads into the core and not only exerts a feeding force tending to draw the drill into the coal, but toward its rear end breaks up the core and directs the pieces thereof rearwardly. This feeding action is also inherent in various of the other pilots shown herein.

In Figs. 11 to 13 the shaft 50, guided by the bushing 50¹, corresponds to the shaft 14 of Fig. 4 and is driven in the same manner. However, in this case the screw conveyer shaft 51 surrounds the shaft 50 and carries the cutting head 52 of the core cutter 53. The centering bit 54 is connected to the shaft 50 by a coupling 55, the members 54 and 55 corresponding to the members 45 and 44 of Fig. 9. Spiral teeth 56 are formed internally within the head 52, and cooperate with the external teeth on the member 55 to break up the cores, and to move the broken pieces rearwardly. As the drill enters a core hole, the broken core pieces will be directed rearwardly through openings 57 in the head 52, into the conveyer tube or conduit 58. It is obvious that the pilot and core-breaking members heretofore disclosed may be substituted for the pilot and core-breaking combination 54 and 55 of Fig. 12.

In Figs. 14 and 15 is shown a structure having a cutter head 60 provided with inserted core-cutting teeth 61. The head 60 had longitudinally-extending recesses for receiving the shanks of the cutting teeth 61. A clamping collar or sleeve 62 has threaded connection with the head 60 and is forwardly flared so that it can be screwed into position to clamp the teeth 61 upon the head. In this structure the conveyer shaft 63 is split and threaded in its front end to serve as a chuck member for receiving the shaft of a pilot drill 64, the threaded end of the shaft being tapered so that when a chuck collar 65 is screwed thereon, the split end of the shaft 63 will be caused to clamp the tool 64. The chuck sleeve 65 has a spiral vane 66 which breaks up the core and forces the pieces to the conveyer. It is obvious that this combination of chuck sleeve 65 with a spiral vane 66 may be adapted to the various other core-forming cutters I have disclosed.

Fig. 16 shows a pilot or cutter 67 of gimlet form, which ordinarily will penetrate the coal to a greater depth than the pilots or drills of certain of the other figures.

In Figs. 17 and 18 I show a core cutting band 70 of somewhat different form than that shown in Figs. 5 and 6, in that the band is formed of a single piece instead of two pieces. The band is, however, flexible, and can be bent radially, and at 70, 72 and 73 it can be bent so that it will enter axially-extending slots in the cutter head 74, that portion of the band between 72 and 73 being disposed exteriorly of the cutting head and that portion between 71 and 72 being disposed internally of the cutting head. The ends of the band may be secured together either by spot welding or by rivets 75 and spaced apart by means of a spacing strip 76 which lies within a slot formed in the cutting head. That portion of the band between 73 and 75 will be disposed internally of the cutting head, while that portion between the points 71 and 75 will be disposed exteriorly thereof, with the result that a wider kerf will be cut around the core than if the band 70 were disposed in a true circle. This arrangement is somewhat more desirable than the arrangement shown in Figs. 5 and 6, in that there is less tendency for the cutter to creep sidewise.

Referring now to Figs. 19 to 21, I show a structure that is especially suitable for cutting metal and other hard materials such as stone. In this structure the pilot 77 is located a considerable distance in advance of the core-cutting head 78 and has an additional inner cutter 79 located in advance of the outer cutting head 78. The pilot 77 and the inner cutter 79 are both carried and driven by the conveyer shaft 80. The cutting members 79 have welded thereto hardened steel cutting faces 81 of tungsten carbide, or the like. The cutter head 78 has teeth 82 formed thereon, with tungsten carbide or other specially hardened steel cutting faces 83 welded to the teeth. This arrangement is especially suitable for drilling materials such as hard rock and steel, because of what might be termed the three stages of cut—by the rapidly rotating pilot 77, together with the inner cutter and teeth 79, and the slower rotating outer cutter 78 carrying teeth 82.

When drilling less fragile materials such as the harder and malleable metals, the cutting faces 83 of the teeth 82 are of such radial dimension that their inner edges are approximately in axial alignment with the outer edges of the teeth 79, so that the members 77, 79 and 82 will cut all of the material in drilling a hole, instead of forming a core. The three cutting elements 77—79—82, effect progressive cutting of the material to be removed in forming a hole. Thus with the pilot 77 driven at high speed as where the shaft 80 has direct connection with the motor, there is rapid cutting of the central portion of the hole. The cutter 79 carrying pilot 77, removes another part of the material from the hole while the cutter 82 completes the removal of the material. When drilling more fragile material such as coal, slate, limestone, etc. and certain softer metals and alloys, the width of teeth 83 of the outer cutter 78 should be reduced to increase the diameter of the core thus formed, and the teeth 79 of the inner cutter should be likewise reduced, so as to leave a core such as can conveniently be broken away by the cam-like action of the rotating end of spiral 84.

The pilot 77 serves also as a feeler for warning the operator of the presence of extremely hard substances or hard spots in the material which is being drilled. Thus in the drilling of coal, if the drill encounters stone or slate or other material of extremely hard character, which might break the cutting faces 81 and 83, or otherwise damage the cutters, the operator will be warned to withdraw the drill and start a hole in another spot. Expensive delays and repairs are thereby avoided. The danger of breakage in such instances arises because the drill and cutters will be driven at the highest speed suitable for the material being drilled, and sudden impact on hard material at such speeds causes the damage referred to. Also, such high speeds would be too great for the harder material encountered, because of overheating and burning of the tools. The bit 77 is inexpensive as compared to the cutters 79 and 82 and can be quickly replaced in case of damage thereto.

While the cutting teeth 82 are shown as of wide radial dimension, it will be understood that such dimension can be shortened and the drill used in the cutting of cores from coal or the softer stones, the cores of which can be readily broken. In the latter case, the first turn 84 of the screw conveyer will serve as a cutting edge to break up the core.

It will be seen that the spiral vane or conveyer on the shaft 80 has bearing engagement with the cutter head 78, so that whipping of the pilot 77 such as would occur through flexing of the shaft 80 is resisted and it is thus consequently maintained in a straighter path. Also, the said bearing supports the cutter head 78 against angular deflections, because the pilot 77 in entering the material functions as a pilot and somewhat as an anchor against radial deflections of the cutter head. It will be understood that the size of holes and the character of the material being penetrated govern the rotating speeds. I have shown and described types of drives suitable for drilling holes in coal seams or other similar earth strata and further decrease in speed by means of additional reduction gearing should be provided for drilling harder materials.

In Figs. 22 and 23 I show a drill arrangement similar to that of Fig. 1, but wherein the motor 84 is disposed at right angles to the axis of the drill shaft instead of parallel thereto. In this arrangement, there is better balancing or distribution of the weight of the apparatus when held by the operator, particularly when drilling horizontal holes as more common with mining, and consequently he can more accurately position and direct the drill into the work. Thus when he grips the handles 85 of the motor casing, the weight of the motor will tend to maintain the drill in a horizontal position and perpendicular to the vertical face of the coal.

In this structure the shaft 86 which corresponds to the shaft 14, carries a gear wheel 87 that is driven from a pinion 88 on the motor shaft, while the tubular shaft 89 which carries the cutter head 90 is connected to a beveled gear wheel 91 through a spindle 92, the gear wheel being driven by a pinion 93 on the motor shaft. These gears may be proportioned to obtain the desired rotative speeds for the material being drilled.

In various of the forms of structure above described, I prefer to rotate the pilot and inner cutter at a greater number of revolutions per minute than the rate at which the outer cutter head is rotated, so that the inner cutter and the outer cutter may have approximately the same peripheral speed. This not only facilitates rapid penetration of the material being drilled, but also results in a better balancing of the cutting and drilling torques above referred to.

Figs. 24, 25 and 26 show still another form of core cutter which can be substituted for the core cutters of Fig. 1 and various of the other figures. As here shown, the structure includes a hollow shaft 95 and a cutter head 96 which corresponds to the elements 25 and 27 respectively of Fig. 1.

The core cutting band or saw 97, of steel, is formed into a curved blade to be sprung into place over pins 99 against the inside walls of the forward end of cutter head 96. Pins 99 serve to hold saw blade 97 in proper relation to the cutter head 96 and cause it to rotate therewith. The holes in the saw blade 97 for engagement with the pins 99 are formed, one in the center of the band and the other with a half hole in each end of the blade, as shown at 98 in Fig. 26. The cutter band has snug fit with the head, and the arrangement permits of convenient replacement of the saw bands.

Figs. 27 and 28 show a modification of the structure of Figs. 24 to 26. In this structure studs 100 which are carried by the cutter head and correspond to the studs 99 have heads or enlargements 101 formed on their inner ends, of greater width than the slots 102 formed at the inner edge of the cutter band 103, so that said heads will overlie the inner wall of the band and hold it more firmly in place.

While my invention has been herein mainly described as a device for drilling relatively small holes as common to blasting operations, it can obviously be enlarged upon and used as a material-penetrating and removal device on a large scale, by its being mounted for universal movement upon a wheeled or other mobile support. In such instances conveyers or some of the other many means of receiving and transporting material may be substituted for the receptacle 24 shown in Fig. 2.

Obviously those skilled in the art may make changes in details and arrangement of parts in addition to such as I have pointed out and without departing from the spirit and scope of my invention as defined by the claims hereto appended. I desire therefore not to be restricted to the precise construction and particularly the gearing disclosed and the electric drive as my invention so obviously lends itself to all other motive powers and means of providing rotation.

I claim as my invention:

1. A manually held drilling apparatus comprising a housing, a motor mounted in said housing and having a motor shaft, a spiral conveyor shaft joined to said motor shaft and driven directly thereby, a cutter secured to the forward end of said conveyor shaft, a hub mounted in said housing, means associated with said motor shaft for rotating said hub in a direction opposite to the direction of rotation of said conveyor, a tube connected to and rotatable with said hub and surrounding said conveyor shaft, an annular cutter head secured to the outer end of said tube, and a stationary sleeve surrounding said rotatable tube and secured to said housing.

2. A manually held drilling apparatus comprising a housing having operators gripping handles thereon, a motor mounted in said housing, a spiral conveyor shaft having its rear end secured to the shaft of said motor, a hub rotatably mounted in said housing, a tube secured to said hub and surrounding said conveyor shaft, an annular cutter head secured to the forward end of said tube, means for rotating said hub and the tube and cutter head carried thereby, a wedge shaped cutter secured to the forward end of said conveyor shaft and projecting beyond said annular cutter head, and a stationary tube secured to said housing and surrounding said tube.

3. A manually held drilling apparatus comprising a housing having handles on the sides thereof, a motor mounted in said housing and having a motor shaft extending longitudinally thereof, a conveyor shaft secured to said motor shaft in axial alignment therewith, a spiral fin on said shaft, a hub journaled in said housing and surrounding said conveyor shaft, a tube surrounding said shaft and secured to said hub, said shaft and tube forming a screw conveyor, an annular cutter head secured to the forward end of said tube, means associated with said motor shaft for rotating said tube, and a wedge shaped cutter secured to the forward end of said conveyor shaft and projecting beyond said annular cutter head.

4. A manually held drilling apparatus comprising a motor housing having operators gripping handles along the sides thereof, an electric motor mounted in said housing and having a motor shaft extending longitudinally thereof, a spiral conveyor shaft secured to said motor shaft and rotatable therewith, a hub journaled in said housing and surrounding said spiral conveyor shaft, a train of gears connecting said hub to the motor shaft whereby said hub is rotated in a direction opposite to the direction of rotation of said motor shaft and at substantially lower speed, a tube connected to said hub and surrounding said conveyor shaft, an annular cutter head secured to the forward end of said tube, a wedge shaped cutter secured to the forward end of said conveyor shaft and projecting beyond said annular cutter, and a stationary sleeve secured to said housing and surrounding and protecting said tube, the forward end of said sleeve abutting against an external shoulder on said annular cutter head.

5. A manually held drilling apparatus comprising a housing having holding handles thereon, an electric motor mounted in said housing, a spiral conveyor shaft secured to the shaft of said motor and rotatable therewith, a tube surrounding said conveyor shaft, means associated with said motor shaft for rotating said tube in a direction opposite from the direction of rotation of said spiral conveyor shaft, an annular cutter head secured to the forward end of said tube, a wedge shaped cutter having external threads secured to the forward end of said conveyor shaft and projecting beyond said annular cutter head, and a stationary sleeve secured to said housing and surrounding and protecting said tube.

6. A manually held drilling apparatus comprising a housing having holding handles thereon, an electric motor mounted in said housing, a spiral conveyor shaft secured to the shaft of said motor and rotatable therewith, a tube surrounding said spiral conveyor shaft, an annular cutter head secured to the forward end of said tube, means associated with said motor for rotating said tube, a pilot cutter secured to the forward end of said conveyor shaft and projecting beyond said annular cutter head, a stationary sleeve secured to said housing and surrounding and protecting said tube, and means on said pilot cutter for feeding said apparatus into the bore, and for breaking up the core cut by said annular cutter head.

7. A manually held drilling apparatus comprising a housing having handles on the sides thereof, an electric motor mounted in said housing, a spiral conveyor shaft secured to the shaft of said motor and rotatable therewith, a tube surrounding said conveyor shaft, means associated with the motor shaft for rotating said tube in a direction opposite from that of the spiral conveyor shaft, an annular cutter head having eccentrically arranged saw teeth secured to the forward end of said tube, a cutter secured to the forward end of said conveyor shaft, and projecting beyond said annular cutter head, and a stationary sleeve secured to said housing and surrounding and protecting said tube.

8. A manually held drilling apparatus comprising a housing having handles along the sides thereof, a motor mounted in said housing, a spiral conveyor shaft secured to the drive shaft of said motor and rotatable therewith, a tube surrounding said spiral conveyor shaft, means associated with said motor for rotating said tube in an opposite direction from the direction of rotation of said conveyor shaft, an annular cutter head having eccentrically arranged teeth secured to the forward end of said tube, a conical shaped cutter having an external thread secured to the forward end of said conveyor shaft and projecting beyond said annular cutter, and a sleeve secured to said housing and surrounding and protecting said tube.

9. A manually held drilling apparatus comprising a housing having handles along the sides thereof, an electric motor mounted in said housing, and having a shaft extending longitudinally thereof, a spiral conveyor shaft secured to said motor shaft and rotatable therewith, a hub journaled in said housing and surrounding said spiral conveyor shaft, a train of gears connecting said hub to the motor shaft whereby said hub is rotated in a direction opposite to the direction of rotation of said motor shaft and at a substantially lower speed, a tube connected to said hub and surrounding said conveyor shaft, an annular cutter head secured to the forward end of said tube, a toothed cutter secured to the forward end of said conveyor shaft and having the outer edge of the teeth thereon in approximate axial alignment with the inner edge of the annular cutting head, and a stationary sleeve secured to said housing and surrounding and protecting said tube.

10. A manually held drilling apparatus comprising a housing having handles along the sides thereof, an electric motor mounted in said housing, a spiral conveyor shaft secured to the shaft of said motor and rotatable therewith, a hub journaled in said housing and surrounding said spiral conveyor shaft, speed reducing gears connecting said hub to the shaft of said motor whereby said tube is rotated at a speed substantially slower than the speed of rotation of said conveyor shaft, a tube connected to said hub and surrounding said conveyor shaft, a toothed annular cutter head secured to the forward end of said tube, a toothed cutter secured to the forward end of said conveyor shaft and projecting beyond said annular cutter head, the outer edges of the teeth on said last mentioned cutter being approximately in axial alignment with the inner edges of the teeth on the annular cutter head, and a stationary sleeve secured to said housing and surrounding and protecting said tube.

11. A manually held drilling apparatus comprising a housing having handles thereon, an electric motor mounted in said housing, a spiral conveyor shaft secured to the shaft of said motor and rotatable therewith, a hub journaled in said housing and surrounding said spiral conveyor shaft, means associated with said drive shaft for rotating said hub, a tube connected to said hub and surrounding said conveyor shaft, an annular cutter head secured to the forward end of said tube, cutting teeth mounted on said annular cutting head, a drill secured to the forward end of said conveyor shaft and projecting beyond said annular cutter head, and cutting members between the forward end of said drill and the cutting teeth on said annular head, the outer edges of said cutting members being in axial alignment with the inner edges of the cutting teeth mounted on said annular cutter head.

12. A manually held drilling apparatus comprising a housing, an electric motor mounted in said housing, a conveyor shaft secured to the shaft of said motor, a hub journaled in said housing and surrounding said spiral conveyor shaft, means associated with the shaft of said motor for rotating said hub in a direction opposite from the direction of rotation of said conveyor shaft and at a substantially lower speed, a tube connected to said hub and surrounding said conveyor shaft, an annular toothed cutter head secured to the forward end of said tube, cutting teeth secured to the forward end of said shaft and projecting beyond the cutting teeth on said annular head, and a stationary sleeve secured to said housing and surrounding and protecting the tube, the stationary sleeve being of smaller diameter than the annular cutter head and having its forward end abutting against said head.

13. A manually held drilling apparatus comprising a housing, an electric motor mounted in said housing, a spiral conveyor shaft in alignment with and secured to the shaft of said motor, a hub journaled in said housing and surrounding said spiral conveyor shaft, means associated with the shaft of said motor for rotating said hub in a direction opposite from the direction of rotation of said conveyor shaft, a tube connected to said hub and surrounding said conveyor shaft, an annular cutter head secured to the forward end of said tube, a cutter secured to the forward end of said conveyor shaft and projecting beyond said annular cutter head, and a stationary sleeve secured to said housing and surrounding and protecting said tube.

14. A manually held drilling apparatus comprising a housing, a motor mounted in said housing and having a drive shaft, a spiral conveyor shaft having one end journaled in said housing and connected for rotation with the drive shaft of said motor, a hub journaled in said housing and surrounding the end of said spiral conveyor shaft, a forwardly extending tube connected to said hub and surrounding said conveyor shaft, an annular cutter head secured to the forward end of said tube, a cutter secured to the forward end of said conveyor shaft and projecting beyond said annular cutter head, means for connecting said hub to the drive shaft of said motor to rotate said tube at a slower speed and in an opposite direction from the direction of rotation of said conveyor shaft, and protective means secured to said housing and surrounding said tube.

15. A manually held drilling apparatus comprising a housing, a motor mounted in said housing and having a motor shaft, a spiral conveyor shaft having one end journaled into said housing and connected for rotation with said motor shaft, a cutter secured to the forward end of said conveyor shaft, a hub mounted in said housing and surrounding the inner end of said conveyor shaft, a tube secured to said hub and surrounding said conveyor shaft, an annular cutter head secured to the forward end of said tube, and means connecting said hub to said motor shaft whereby said hub and the tube connected thereto are rotated in a direction opposite to the direction of rotation of said conveyor shaft.

16. A manually held drilling apparatus comprising a housing, a motor mounted in said housing and having a drive shaft, a conveyor shaft having one end projecting into said housing and connected for rotation with the drive shaft of said motor, a tube surrounding said conveyor shaft, an annular cutter head secured to the forward end of said tube, a cutter secured to the forward end of said conveyor shaft and projecting beyond said annular cutter head, and means connecting said tube to the drive shaft of said motor whereby said tube is continuously rotated in an opposite direction from the direction of rotation of said conveyor shaft.

JOSEPH F. JOY.